United States Patent [19]

Tower et al.

[11] Patent Number: 4,839,137

[45] Date of Patent: Jun. 13, 1989

[54] NUCLEAR STEAM SUPPLY SYSTEM AND METHOD OF INSTALLATION

[75] Inventors: Stephen N. Tower, Murrysville; James A. Christenson, Forward Township; Howard E. Braun, Pittsburgh, all of Pa.

[73] Assignee: Westinghouse Electric Corp., Pittsburgh, Pa.

[21] Appl. No.: 195,438

[22] Filed: May 16, 1988

Related U.S. Application Data

[63] Continuation of Ser. No. 785,097, Oct. 4, 1985, abandoned, which is a continuation of Ser. No. 614,715, May 29, 1984, abandoned, which is a continuation of Ser. No. 350,268, Feb. 24, 1982, abandoned.

[51] Int. Cl.⁴ .................... G21C 1/00; G21D 1/00
[52] U.S. Cl. .................... 376/260; 376/273; 376/285; 376/293; 376/305; 376/317; 376/909; 376/912; 405/203; 405/205
[58] Field of Search .................... 376/260-262, 376/293, 273, 909, 912, 285, 305, 317; 60/669, 683, 645, 720, 721; 405/195, 209, 203-205, 207; 290/1 R, 1 A, 52, 54

[56] References Cited

U.S. PATENT DOCUMENTS

| | | | |
|---|---|---|---|
| Re. 30,280 | 5/1980 | Berman et al. | 290/1 R |
| 1,310,461 | 7/1919 | Williams | 405/204 |
| 2,861,033 | 11/1953 | Treshow . | |
| 3,011,317 | 12/1961 | Wolff | 405/207 |
| 3,262,411 | 7/1966 | Kaltenecker | 405/207 |
| 3,351,027 | 11/1967 | Ellard, Jr. et al. . | |
| 3,547,778 | 12/1970 | Flaherty et al. | 376/912 |
| 3,679,159 | 7/1972 | Bach et al. . | |
| 3,712,851 | 1/1973 | Isberg et al. | 376/273 |
| 3,793,145 | 2/1974 | Jordan et al. | 376/293 |
| 3,794,849 | 2/1974 | Perry et al. | 376/912 |
| 3,930,943 | 1/1976 | Michel et al. | 376/287 |
| 3,962,877 | 6/1976 | Schiemichen | 405/203 |
| 3,986,367 | 10/1976 | Kalpins . | |
| 4,009,676 | 3/1977 | Kura | 376/909 |
| 4,036,687 | 7/1977 | Rickard et al. | 376/293 |
| 4,050,983 | 9/1977 | Kleimola | 376/283 |
| 4,167,087 | 9/1979 | Schabert et al. | 376/273 |
| 4,206,013 | 6/1980 | Dickey | 376/912 |
| 4,293,240 | 10/1981 | Ogimoto et al. | 60/721 |
| 4,355,001 | 10/1982 | Pierart | 376/909 |

FOREIGN PATENT DOCUMENTS

| | | | |
|---|---|---|---|
| 1126527 | 3/1962 | Fed. Rep. of Germany . | |
| 2264473 | 3/1976 | Fed. Rep. of Germany . | |
| 2644778 | 4/1978 | Fed. Rep. of Germany . | |
| 2850535 | 5/1980 | Fed. Rep. of Germany . | |
| 0014045 | 2/1977 | Japan | 405/203 |
| 0114813 | 9/1980 | Japan | 60/669 |
| 1429685 | 3/1976 | United Kingdom | 375/262 |
| 1454291 | 11/1976 | United Kingdom | 376/912 |

OTHER PUBLICATIONS

Nuclear Eng. & Design, vol. 25, 1973, pp. 334-349, Orr et al.
2nd U.N. Geneva Conf. on Atomic Energy, 1958, vol. 11, p/172, Carlbom et al., pp. 101-106.
Kraftwerke im Meer-Deutsche Zeitschrift-1974, Maniago, pp. 125-129.
Handbuch der Werften 1956, p. 14, Schroedter (I).
Handbuch der Werften 1958, pp. 38-41, Schroedter (II).
Huber-Museumsschriff-Informationsblatt No. 69, (1984), Hunziker-Dampferzeitung 3/80.

Primary Examiner—Harvey E. Behrend
Attorney, Agent, or Firm—D. C. Abeles

[57] ABSTRACT

A method of providing a nuclear steam supply system that is constructed to include a barge or flotation base as an integrated portion thereof. The system is tested for operability and safety at the factory and then towed along navigable coastal or inland waterways, or overseas to foreign locations, to a prepared foundation site at its point of use. The overall unit is so constructed and arranged as to permit the removal of top and side portions to permit passage under low bridges and through narrow locks without requiring disassembly of safety class piping and wiring. The method further provides for a complete nuclear power plant constructed on multiple barges at a separate factory site in parallel with plant site preparation, i.e., in estuaries or caves.

10 Claims, 9 Drawing Sheets

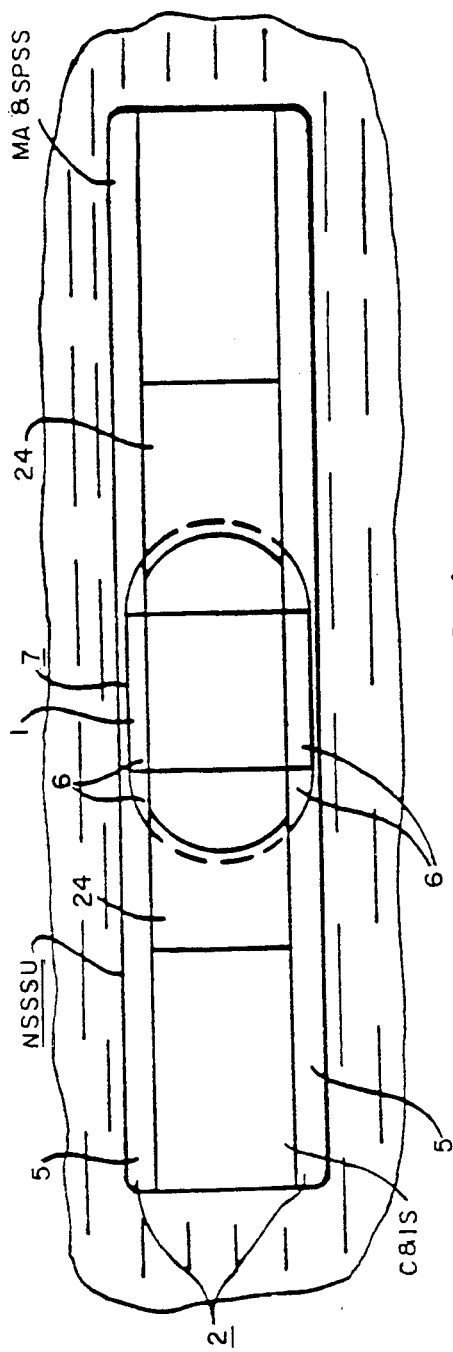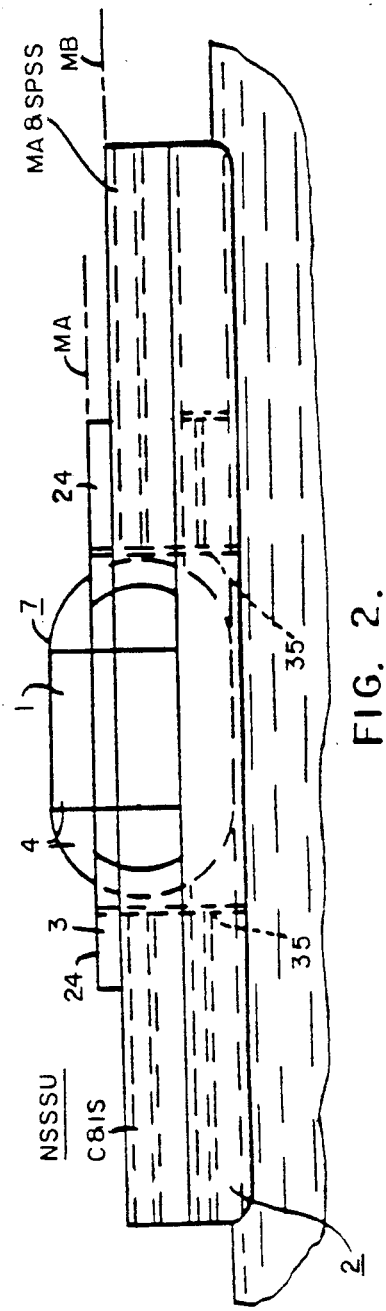

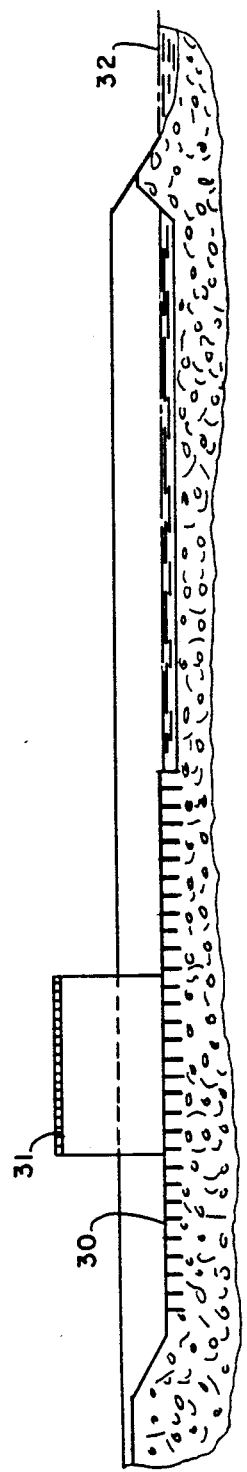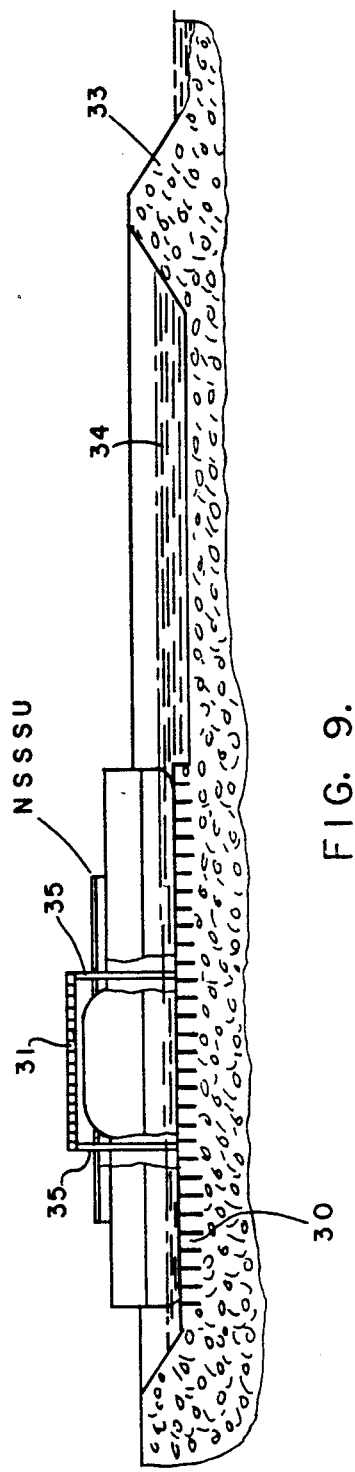

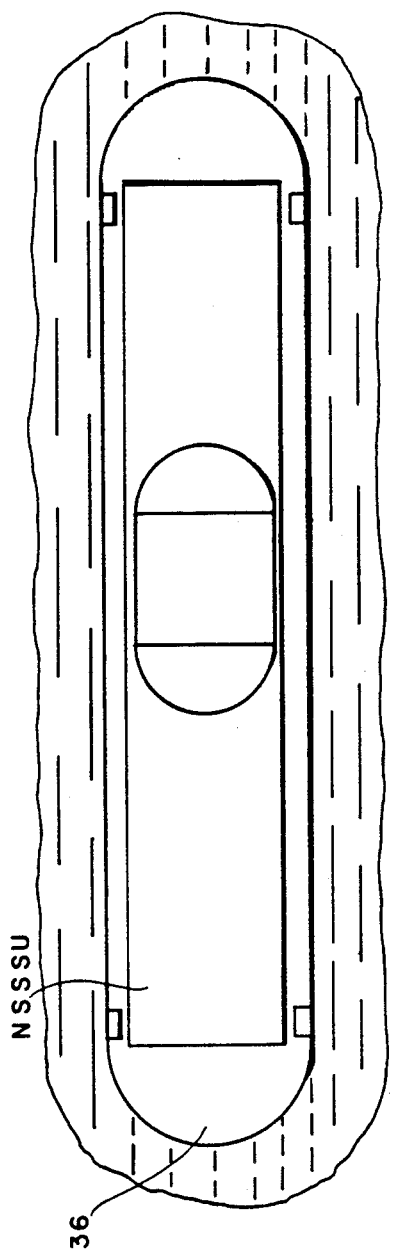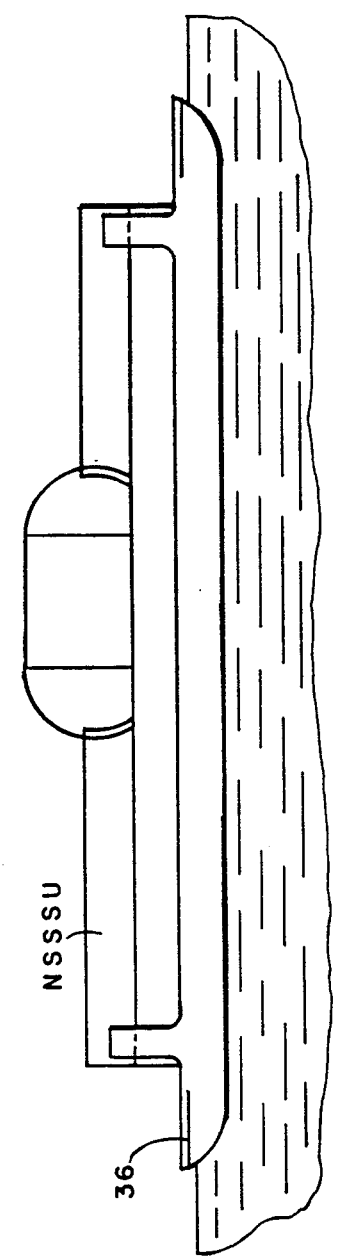
FIG. 10.
FIG. 11.

NUCLEAR STEAM SUPPLY SYSTEM AND METHOD OF INSTALLATION

REFERENCE TO RELATED APPLICATIONS

This application is a continuation of application Ser. No. 785,097 filed Oct. 4, 1985, now abandoned, which is in turn a continuation of application Ser. No. 614,715 filed May 29, 1984, now abandoned, which is in turn a continuation of application Ser. No. 350,268 filed Feb. 24, 1982, now abandoned, which is in turn a continuation-in-part of application Ser. No. 249,522 filed Mar. 31, 1981, now abandoned.

BACKGROUND OF THE INVENTION

The present invention relates to a prefabricated nuclear steam supply system unit and method of installation.

Advantages would appear to result in the provision of a nuclear steam supply system that can be of standardized construction, prefabricated, inspected and tested substantially at the factory site, and transported as a unit to different intracontinental and intercontinental use sites.

SUMMARY OF THE INVENTION

A nuclear steam supply system unit, NSSSU, is hereby provided that is constructed to include a barge or flotation base as an integrated portion thereof. The system may be tested for operability and safety at the factory and then towed along navigable coastal or inland waterways, or overseas to foreign locations to a prepared foundation site at its point of use. In one embodiment, the overall unit is so constructed and arranged as to permit removal of top and side sections to permit passage under low bridges and through narrow locks without requiring disassembly of safety class piping and wiring.

The unit includes a horizontal generally cylindrical steel containment shell encasing the reactor and the steam generators, with all safety related components, equipment, diesel power supplies, controls and devices incorporated in the unit on the flotation base fore and aft of the shell.

Inclusion of an open-ended radiation and missile shield on a foundation at the use site into which the NSSSU may be installed, enables construction work to roceed simultaneously in the field and at the factory.

The combination of a field-built missile shield and the factory-built steel containment shell provides for double, "pump-back", containment.

The total plant can be constructed on multiple barges at a factory site in parallel with site construction in estuaries or caves.

Location of the foundation above flood level can be made possible by raising the NSSSU by way of a temporary water lock during installation.

Cellular portions of the flotation base are adapted to be filled with concrete for shielding after arrival at the installation site to allow for shallowdraft flotation during inland waterway transport. Some cells may be cement-filled initially for float-leveling trim.

Other features and advantages of the invention will become apparent from the following description thereof.

BRIEF DESCRIPTION OF THE DRAWINGS

FIGS. 1 and 2 are plan and side elevation views, respectively, showing schematically in outline a nuclear steam supply system unit, NSSSU, constructed in accord with features of the present invention;

FIGS. 8 and 9 illustrate use site preparation and installation means for the unit of the present invention;

FIGS. 10 and 11 are plan and side elevation views showing schematically in outline a submergible barge for open-ocean transportation of the NSSSU of the present invention;

DESCRIPTION OF THE PREFERRED EMBODIMENT

Figure 3:
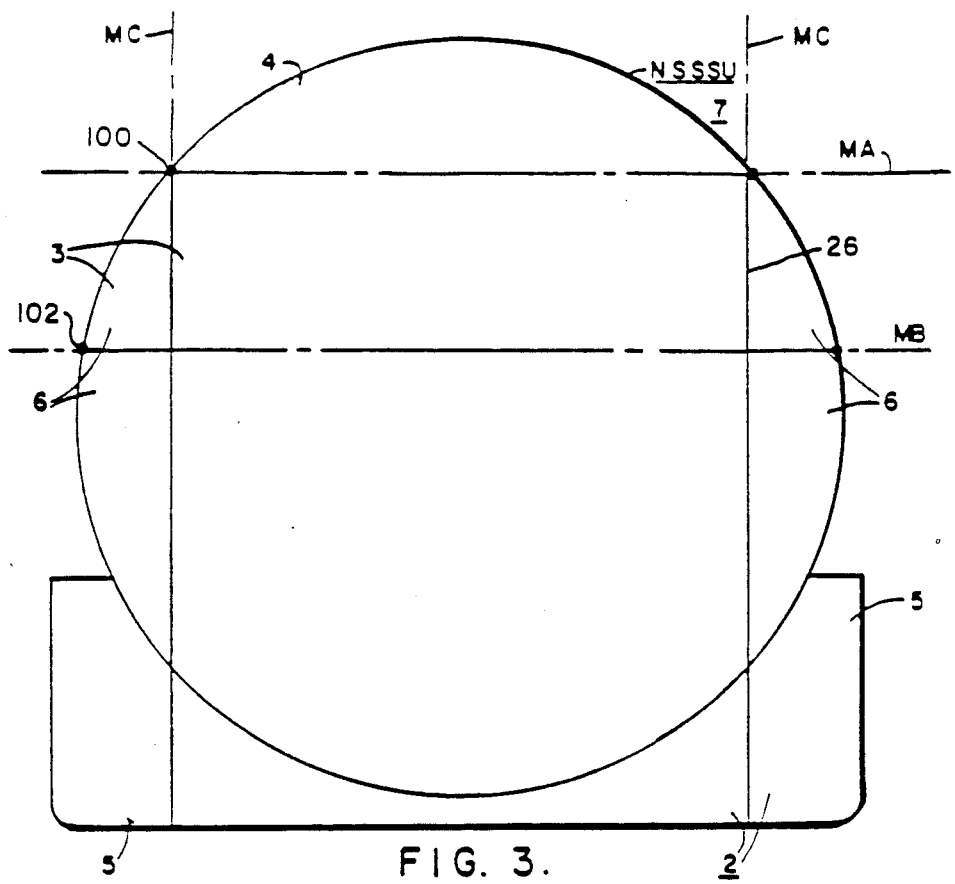
FIG. 3 is an end elevation view of the nuclear steam supply system unit of FIGS. 1 and 2.
Figure 6:
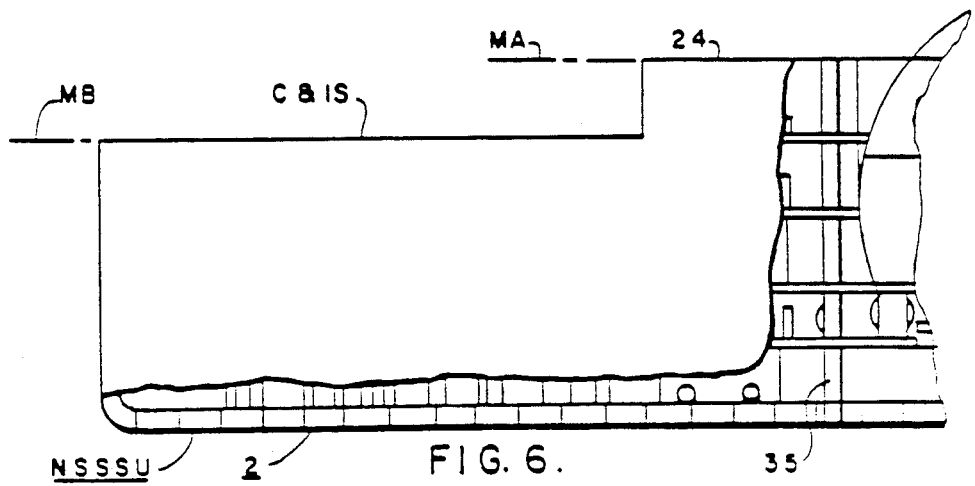
FIG. 6 is a side-elevational view. substantially in outline showing a control and instrumentation section, C and IS, of the unit of the present invention.

Referring to FIGS. 1, 2 and 3 the basic concept of the present invention resides in the provision of a nuclear steam supply system unit, NSSSU, mounted on integrally formed flotation base 2 so constructed and arranged as to enable such unit to be tested for safety and performance at the factory where it is constructed and thereafter towed while being floated to a pre-constructed foundation at a selected use site along the continental coast, such as that of the United States, or along a major navigable river or lake accessible from the coastline, such as along the Mississippi. Missouri, Ohio, etc. rivers, or along the coast of the Great Lakes in the United States and North America as accessible by way of the St. Lawrence. It is intended that the NSSSU be complete with respect to including all of the operational and safety equipment necessary to function as a source of steam supply. In this regard, the NSSSU includes a fore and aft mid-portion that functions as a nuclear steam supply section, NSSS, in affiliation with a control and instrument section C&IS at one end of the NSSSU and a mechanical auxiliaries and safety power-supply section MA&SPSS at the other end of the NSSSU. The expression "nuclear reactor system" as used in the claims means the complete system including the base or barge 2 with which the nuclear steam-supply section including the shell 7 and the control and instrument section and the mechanical auxiliaries and safety power-supply section are integrated.

The primary salient feature of the NSSSU of the present invention revolves around the construction of the unit such that substantially all of the dynamic functional operational parts of the several longitudinal sections C&IS, NSSS, and the MA&SPSS lie within a widthwise and heightwise region of the unit capable of passing under bridges along the navigable waterway and into and out of locks along the waterway without requiring any substantial significant disassembly of such functional components as factory-installed within the NSSSU. In this regard the overall height of the unit as originally assembled at the factory is adapted to be altered to suit different bridge heights by removal at the factory and reinstallation at the use site, of the several upper structural housing portions of the unit with no or substantially little disturbance to the functional dynamic operational components of the system disposed within the unit. A NSSSU might have a draft of nine feet and an overall height of one hundred and five feet for towing along the coastal areas of the United States, for example, and through the lower regions of the Mississippi River up to Cairo, Ill., for example. If it does continue to proceed along the Missouri or the Ohio Rivers the unit can be adapted for passages under lower bridges of these rivers by removal of the upper section 4 (FIGS. 2, 3, 4) of the nuclear steam supply section of the NSSSU, and finally uppermost regions of the Ohio and Missouri Rivers can be traversed by the unit by further removal of still another upper section 3 of the housing portion of the unit. At this point the overall height of the unit may be in the realm of sixty-seven feet, for example, with a nine foot draft.

To accommodate transit through narrower canal or lock regions, such as along the St. Lawrence Seaway to gain access to the Great Lakes in the North American Continent, the longitudinal side regions 5 (FIGS. 1, 3) of the flotation base 2, together with side regions 6 of a steel containment shell 7 of the NSSS can be removed. In this case the width of the unit may be such as seventy-five feet wide and the overall height can be allowed to be one hundred and five feet with the upper sections 3 and 4 intact. In all cases the length of the unit can be about five hundred and ninety feet and be able to pass through the locks along the aforementioned inland waterways. In the narrower width the flotation base 2 provides less lift and accordingly the water level draft tends to be in the order of fifteen feet rather than the nine-foot draft of the wider configuration of the flotation base 2.

Figure 4:
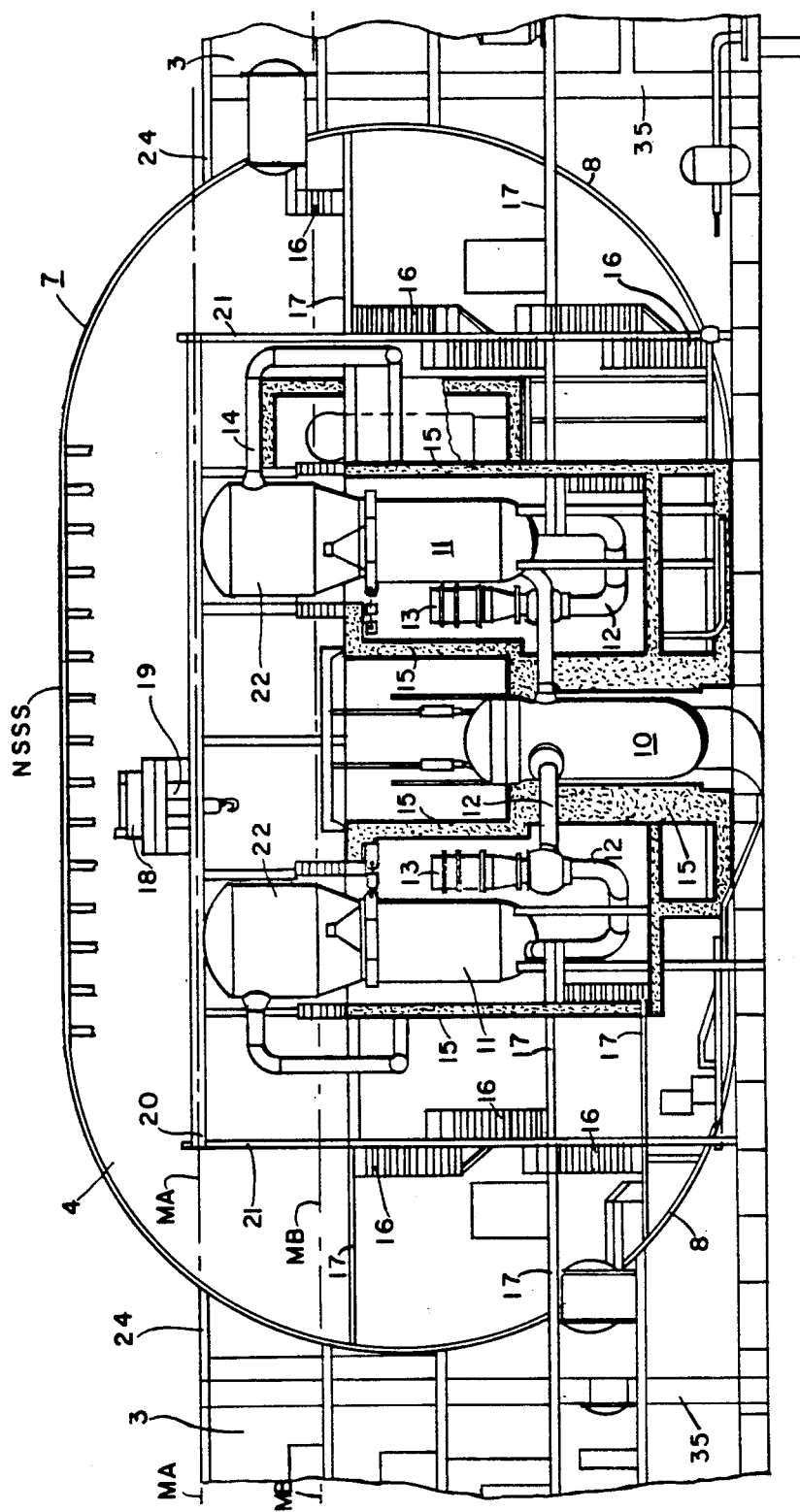
FIG. 4 is a side elevation view, partly in outline and partly in section, showing details of a nuclear steam supply section. NSSS, of the unit of the preceding figures.
Figure 5:
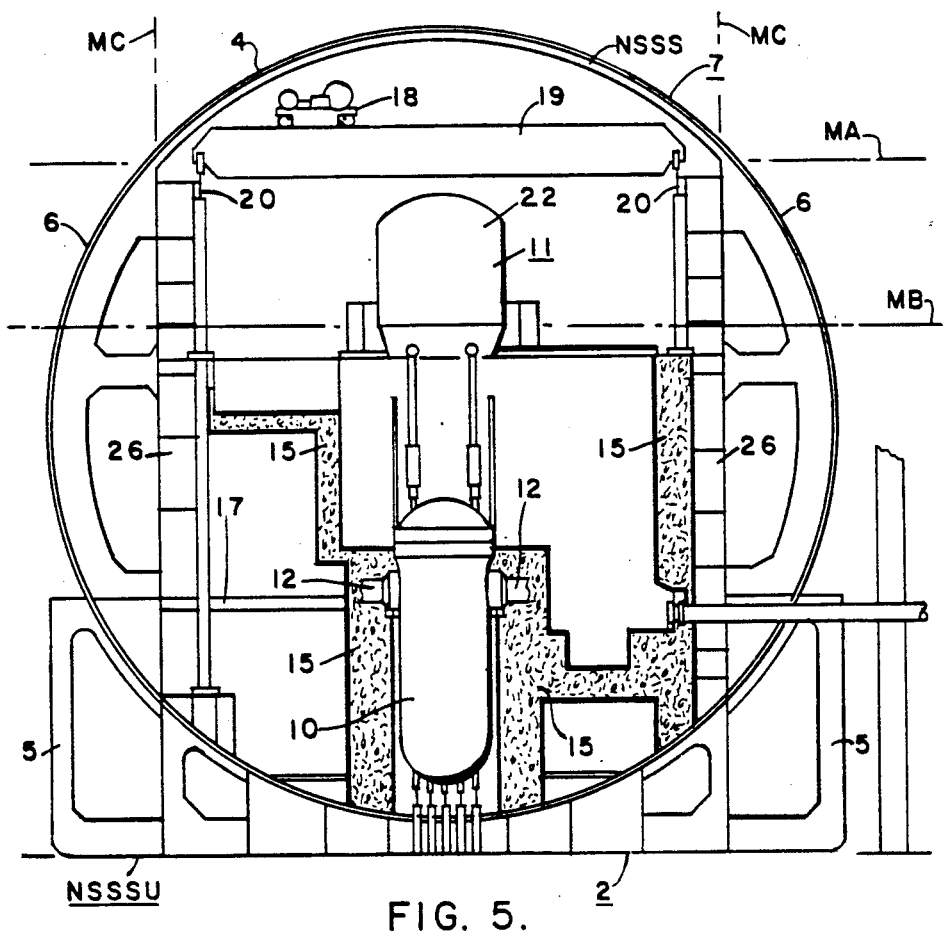
FIG. 5 is a lateral cross-sectional view, partly in outline, of the NSSS of the unit of the present invention.
Figure 7:
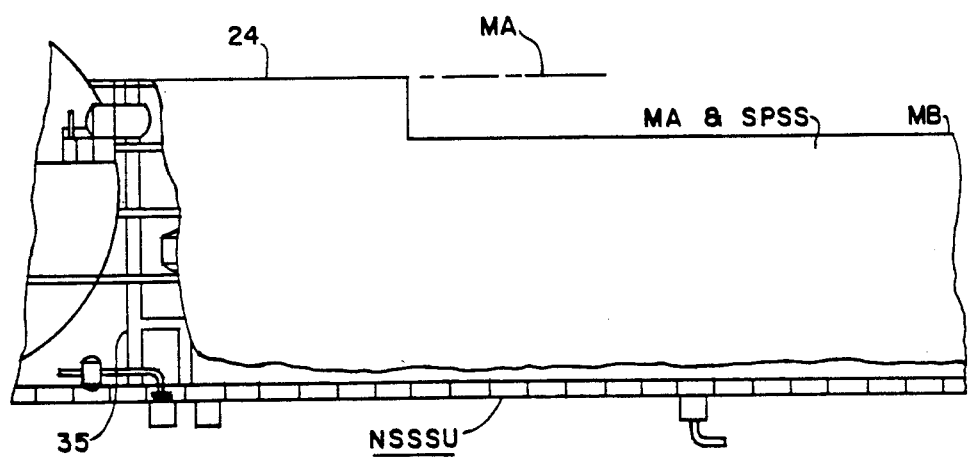
FIG. 7 is a side-elevational view substantially in outline showing a fluid systems, auxiliary and safety power supply section of the unit of the present invention.

Referring to FIGS. 4 and 5, the nuclear steam supply section, NSSS, is integrally mounted on the flotation base 2, which is of hollow steel construction and of flat hull-like configuration having the longitudinal side regions 5 removably attached thereto. The steel containment shell 7 is generally cylindrical with spherical end regions 8. The shell is mounted on the flotation base 2 and attached thereto as by weldments (not shown). Disposed within the shell 7 there is a nuclear reactor vessel 10. a pair of steam generators 11, primary coolant lines 12 for the reactor vessel 10, pumps 13 for circulating the primary coolant through the reactor vessel 10 by way of the lines 12 and into and through the primary side of the steam generators 11. A steam line 14 exits from the secondary side of each of the steam generators 11 for delivery to a steam operated turbine generator assembly (not shown) ultimately to be affiliated with the unit of the present invention. Disposed around the reactor vessel 10 and around the steam generators 11 are a number of hollow steel wall sections 15 that are adapted to be filled with concrete for radiation shielding purposes once the unit is installed at its ultimate use site. A number of stairways 16 vertically interconnect a plurality of horizontal working platforms 17 disposed within the interior of the shell 7 to accommodate working and operating personnel therein. An overhead crane 18 is provided within the shell 7 above the steam generators 11 that is movable along the cross beam 19 that in turn is capable of moving along longitudinal guide rails 20.

In accord with the primary feature of the invention different height sections are adapted to be removed from the shell 7; the uppermost region having a juncture seam 100 along the horizontal line MA and a second and lower region having a juncture seam 102 along the horizontal line MB. to enable passage of the shell under different height bridges that may exist along the waterways along which the unit is being towed while enroute to a use site. As mentioned hereinbefore, when the uppermost section of the shell 7 is removed, it will be apparent that the crane 18 and cross bridge member 19 also will have to be removed to afford the lowered height for bridge clearance. When the height of the shell is reduced still further to the height designated by the line MB in FIGS. 4 and 5, upper ends of vertical support columns 21 (FIG. 4) for the crane cross member 19 and the tracks 20 etc. also additionally will have to be removed, as will an uppermost section 22 of the steam generator. It also will be apparent from FIGS. 1, 2, 6 and 7 that an uppermost floor 24 of the sections C&IS and MA&SPSS of the nuclear steam supply system unit, NSSSU, also will need to be removed together with the portions of the shell 7 where the overall height is to be reduced to the level represented by the dot dash line MB in the several figures. Vertical sidewalls 26 (FIG. 5) are disposed within the interior of the shell 7, FIGS. 3 and 5, which act to provide structural integrity and support for the nuclear steam supply components disposed in the nuclear steam supply section, NSSS, in the widthwise region between the removable side regions 6 when such regions are removed to accommodate passage through the narrower canalways and locks. The unit is adapted to have the longitudinal side edges 5 of the flotation base 2 removed together with the side sections 6 of the steel containment shell 7 along the dot-and-dash lines MC (FIG. 3).

By making the flotation base 2 together with its vertical walls 26 and all the partitions 15 hollow, a structural rigidity is afforded which is at the same time of sufficiently light weight to enable the nuclear steam plant components to be transported by flotation and ultimately to be filled with cement to provide further rigidity and radiation shielding. Thus upon installation at the use site, replacement of the previously removed clearance-accommodating components will be reinstalled.

The completed nuclear steam supply system unit NSSSU is towed to its use site location to a pre-constructed foundation, FIGS. 8 and 9, on which a hollow radiation shield 31 also will have been constructed. Foundation 30 can be made higher than the water level 32 (FIG. 8) of the river or coastal body of water along which the use site is located by use of a dike 33. An artificial lake 34 can be constructed to enable the floating of the NSSSU into the shield 31 and onto the foundation 30. The work on preparation of the foundation 30 and the shield 31 together with that of the dike 33 can occur simultaneously with the construction of the nuclear steam supply system unit, NSSSU. Once having been installed at the site, the auxiliary equipment components may be added, including the turbine generator plant (not shown) to be operated by the steam derived from the NSSSU. Such steam turbine generator plant may or may not be prefabricated and of the flotation type, according to the desire and need of the user.

Figure 12:
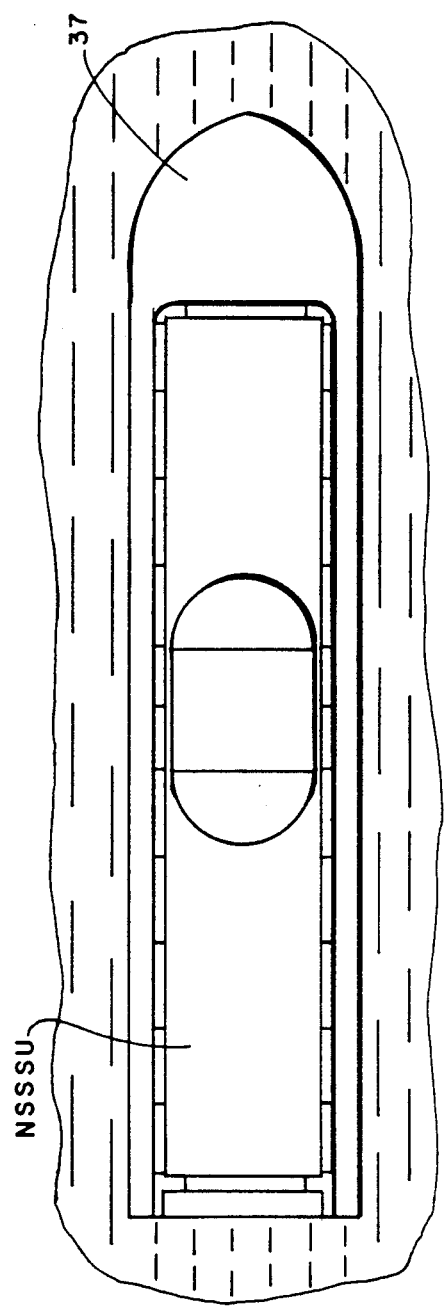
FIGS. 12 and 13 are plan and side elevation views of a bolt-on ocean-going alternative flotation transporter for the NSSSU of the present invention.
Figure 13:
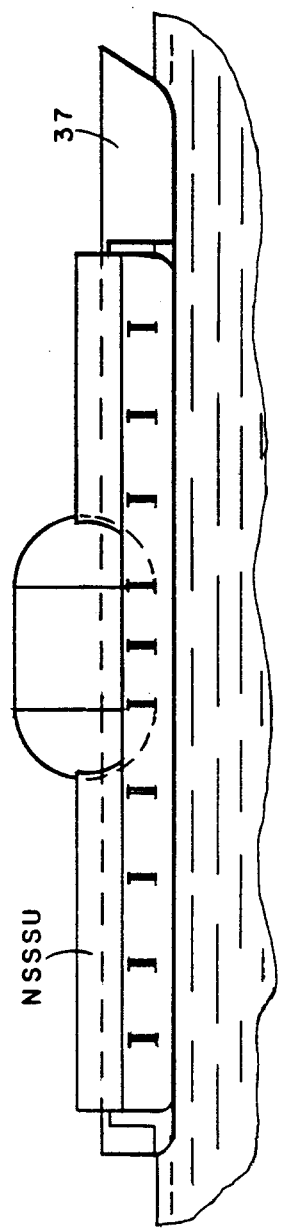
Figure 14:
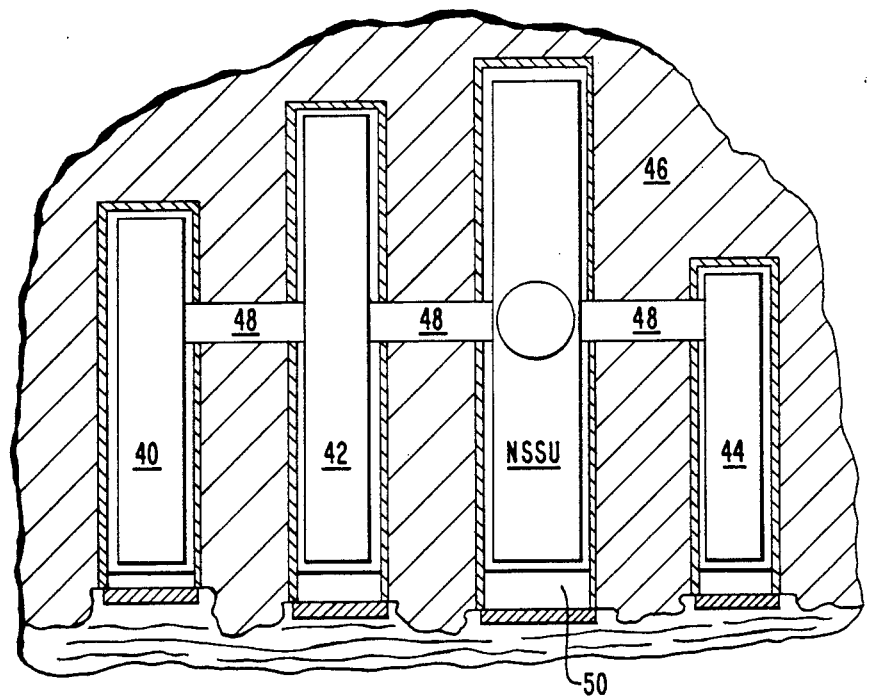
FIG. 14 is a plan view partially in section showing a parallel array of cave-moored barges respectively supporting the turbine building, auxiliary building, nuclear steam supply system and fuel handling building of a nuclear power generation facility constructed in accordance with the principles of this invention.
Figure 15:
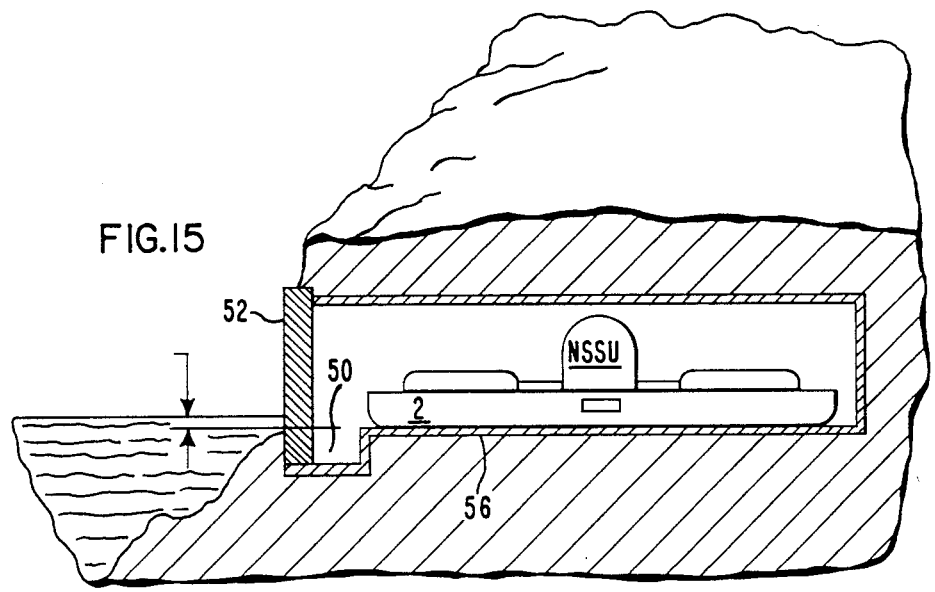
FIG. 15 is a side elevational view, partially in section, showing the nuclear steam supply unit of FIG. 14 on its moorings.
Figure 16:
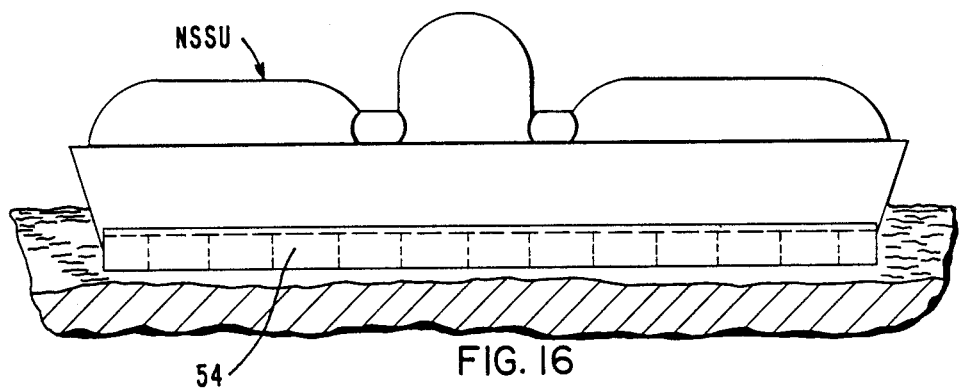
FIG. 16 is a side elevational view, partially in section of a nuclear steam supply unit barge mounted facility having a compartmented buoyancy skirt.
Figure 17:
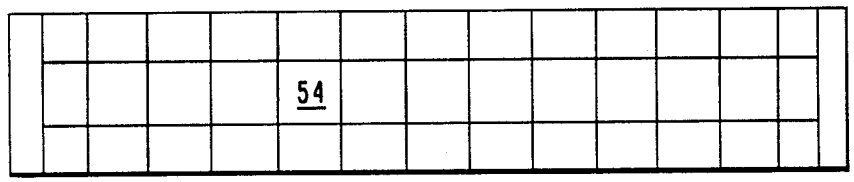
FIG. 17 is a bottom plan view of the compartmented skirt of FIG. 16.

An example of a prefabricated steam turbine generator plant of the flotation type is illustrated in FIG. 14, wherein the complete nuclear facility is illustrated as having its various major components, i.e. the turbine building 40, the auxiliary building 42, the NSSSU and the fuel handling building 44 supported on separate barges. In the example shown, the respective barges are moored in corresponding caves, tunneled in the side of a hill, having interconnecting passages 48 to permit interaction between the various power generating facility components. As with the previous arrangements described, the various plant components may be constructed, in parallel, at factory site facilities which are separate from the plant utilization site. At the same time, tunnels can be cut into river, lake or seacoast mountains or cliffs such that when the tunnels are opened to the adjacent body of water, there is sufficient water level to accommodate the draft of the barge. Smaller interconnecting tunnels 48 between the modules are furnished to permit interaction of the various components. Similar to the installation procedures noted heretofore, the barges may then be floated into place in the tunnels and then the open end of the tunnels can be sealed. The tunnel excavation, preparation and liner, to provide a stable base mat and environment, and prevent rock falls, would be done while the tunnel is dry. Once the barges are floated into position several options are available to secure their moorings. As illustrated in FIG. 15, the barges can be located below the final water level. In such case the tunnel should be constructed with a sump 50 placed at the water end of the tunnel to collect any seepage from the main body of water. The barge would be grounded by pumping out the tunnel. If it's desirable to maintain the barge floating, as for seismic reasons, the water level of the tunnel could be raised to position the barge above normal water level. The barge would then be blocked in place at the higher elevation by a tunnel barrier such as 52 shown in FIG. 15. This arrangement has the advantage of precluding concern and/or need for complex provisions to prevent future tunnel flooding, for example, during times of high water level. Flooding the tunnel with fresh water to float the barge will reduce corrosion; and maintaining the fresh water level above that of any adjacent seawater will preclude in-leakage that might otherwise contaminate the fresh water buffer. To further reduce the vertical seismic loads, compartmentalized skirts 54 could be fitted to the bottom of the barges as illustrated in FIGS. 16 and 17. In one embodiment the skirt compartments would be kept filled with compressed air or nitrogen. The gas, being compressible, would absorb much of the vertical seismic shock. As an alternate, the compartments could be fitted with inflatable bladders 110. Desirably, the "free" water level, that is the water between the floating barge and its base mat 56 (FIG. 15) would be kept to less than one foot to limit vertical movement in the event of loss of water from the tunnel. This would limit the need for piping flexibility. As with above ground sites, the tunnels can be prepared in parallel with plant unit construction at the factory site, with the added advantages of seclusion and greater security.

Where transporting the NSSSU over a large distance on the open seas, it may be preferred to employ such as a submergible barge or floating dry dock 36 as exemplified schematically in FIGS. 10 and 11 to carry such NSSSU. An alternative construction can be to supplement the buoyancy characteristics of the NSSSU by an auxiliary floating hull 37 in which the NSSSU can be fit and secured, as exemplified schematically in FIGS. 12 and 13.

What is claimed is:

1. A method of providing a nuclear reactor power plant at a predetermined use site accessible by predetermined navigable waterways, said method being practiced with apparatus including a nuclear reactor system, the said system having a nuclear steam-supply section including:
    (a) a nuclear-reactor vessel, and
    (b) steam-generator means, including a lowermost portion having primary coolant piping connected to said nuclear reactor vessel and an uppermost portion through which steam is transmitted to the point of use, said uppermost portion being free of primary coolant piping,
the said method comprising:
    (A) constructing a nuclear reactor system at a manufacturing site remote from said predetermined use site but accessible to said predetermined waterways for transportation from said manufacturing site to said predetermined use site, said nuclear reactor system including a barge with said nuclear steam supply section constructed integrally with said barge, and said nuclear reactor system being substantially greater in its length dimension than in its height dimension and being oriented with its length dimension generally horizontally along said barge and its height dimension generally vertically of said barge, and with the overall height of said nuclear reactor system altered to enable said nuclear reactor system to pass under bridges along said predetermined waterway by removal selectively of at least one of at-least-two upper subsections, of said nuclear reactor system one of said upper subsections consisting of all parts of said nuclear reactor system, above a first horizontal plane, said first horizontal plane being above said uppermost portion of said steam generator means, and the other of said atleast-two upper subsections consisting of all parts of said nuclear reactor system above a second horizontal plane, said second horizontal plane being below said first horizontal plane and between said uppermost portion and said lowermost portion of said steam generator means, said second horizontal plane also being above said nuclear reactor vessel, whereby said removal can be accomplished without disturbance of the nuclear reactor vessel and primary coolant piping;
    (B) simultaneously with the said construction of said nuclear reactor system, constructing facilities at said use site to be integrated with said nuclear reactor system to form said nuclear-reactor power plant;

(C) transporting said nuclear reactor system along said waterways to said predetermined use site;

(D) at said use site joining said removal parts of said altered nuclear reactor system to the remainder of said altered nuclear reactor system to complete said nuclear reactor system; and (E) installing said nuclear reactor system at said predetermined use site and integrating said nuclear reactor system to interact with said facilities constructed at said predetermined use site to form said nuclear-reactor power plant.

2. A method of providing a nuclear-fueled power-generating facility to be employed at a predetermined use site, comprising the steps of:

constructing a nuclear reactor system for supplying steam for the power generating facility at a manufacturing site separate from the said use site, as a first integral floatable mobile unit capable of being transported to said predetermined use site along predetermined commercially navigable waterways; power generating facility at a manufacturing site separate from said use site, as a second integral floatable mobile unit capable of being transported to said predetermined use site along predetermined commercially navigable waterways;

constructing at said use site separate first and second caves for respectively receiving said first and second floatable units, each of said caves having separate access to said predetermined navigable waterway for receiving its respective corresponding unit;

constructing an interconnecting passage between the separate first and second caves through which said first and second units can interact;

flooding said first and second caves to provide a flotation path from said predetermined navigable waterways into the respective caves in which the first and second units are to be respectively installed;

transporting said first and second floatable units along said predetermined waterways and housing them in their corresponding caves;

integrating said first and second floatable units by way of said passage;

after said first floatable unit has been transported into and is housed in its associated cave, damming said cave housing said first floatable unit to isolate the water in the cave from the adjacent predetermined navigable waterway; and thereafter raising the water level of the cave housing said first floatable unit above the water level of the adjacent navigable waterway to a level that maintains the bottom of said first floatable unit a short distance of the order of one foot above the floor of the cave, said short distance being such as to limit the vertical movements of said first floatable unit in the event of loss of water from said first caves.

3. A method of providing a nuclear reactor-power plant at a predetermined use site accessible by predetermined navigable waterways, said method comprising:

A. constructing a nuclear reactor system at a manufacturing site remote from said predetermined use site but accessible to said predetermined waterways for transportation from said manufacturing site to said predetermined use site; said nuclear reactor system including a nuclear steam-supply section:

(a) a nuclear reactor vessel, (b) steam-generator means including a lowermost portion having primary coolant piping connected to said nuclear reactor vessel and an uppermost portion through which steam is transmitted to the point of use, said uppermost portion being free of primary coolant piping, the length dimension of said nuclear reactor system being substantially greater than its width dimension; said nuclear reactor system including a barge with the aforesaid components of said nuclear steamsupply section, defined in sub-paragraphs (a) and (b) above constructed integrally with said barge, the said nuclear reactor system being integrated oriented with its length dimension generally horizontally along said barge and its height dimension generally vertically of said barge, the height of said nuclear reactor system being altered, to enable said nuclear reactor system to pass under bridges along said predetermined waterway, by removal selectively of at least one of at-least-two upper subsections of said nuclear reactor system, one of said upper subsections consisting of all parts of said nuclear reactor system, above a first horizontal plane, said first horizontal plane being above said uppermost portion of said steam generator means, and the other of said atleast-two upper subsections consisting of all parts of said nuclear reactor system above a second horizontal plane, said second horizontal plane being below said first horizontal plane and between said uppermost portion and said lowermost portion of said steam generator means, said second horizontal plane also being above said nuclear reactor vessel, whereby said removal can be accomplished without disturbing said nuclear-reactor vessel or said primary coolant piping;

B. also constructing at said manufacturing site an auxiliary unit in addition to said nuclear reactor system as a second flotation unit capable of being transported along said predetermined waterways to said predetermined use site;

C. transporting said nuclear reactor system and said second flotation unit to said predetermined use site along said predetermined waterways;

D. simultaneously with said construction of said nuclear reactor system at said manufacturing site constructing facilities at said predetermined use site, said facilities to be integrated with said nuclear reactor system to form a nuclear reactor-power plant, the construction of said facilities being completed before said nuclear reactor system arrives at said predetermined use site, the construction of said facilities including the following steps:

I. constructing a plurality of caves in a hill;

II. constructing for each said cave a corresponding opening accessible to said predetermined waterways; and III. constructing passages interconnecting said caves;

E. after said nuclear reactor system arrives at said use site, joining said at-least-one of said at-least-two upper subsections to said altered nuclear reactor system to complete said nuclear reactor system;

F. installing said nuclear reactor system and said second flotation unit respectively in separate of said caves; and G. integrating said nuclear reactor system and said second flotation unit with said facilities constructed at said predetermined use site to interact through said passages as a nuclear reactor-power plant.

4. The method of claim 3 including installing the nuclear reactor system in the cave housing said nuclear reactor system;

flooding the cave housing said nuclear reactor system;

floating said nuclear reactor system from the predetermined waterways on which it was transported to the predetermined site into said last-named flooded cave;

damming said last-named cave to isolate the water in said last-named cave from the adjacent predetermined waterways; and raising the water level of said last-named cave above the water level of the adjacent of said predetermined waterway to a level that maintains the bottom of said nuclear reactor system a short distance of the order of one foot above the floor of the cave, said distance being such as to limit the vertical movement of said nuclear reactor system in the event of loss of water from said last-mentioned cave.

5. The method of claim 2 including flooding the cave housing the nuclear reactor system with fresh water to reduce corrosion of said nuclear reactor system.

6. The method of claim 2 including fitting the bottom of the nuclear reactor system with a compartmentalized skirt filled with compressed gas to reduce seismic shocks.

7. The method of claim 2 including fitting the bottom of the nuclear reactor system with an inflatable bladder to reduce seismic shocks.

8. The method of claim 1 wherein in constructing the nuclear reactor system, the channel through which the coolant circulates including the primary coolant lines, the coolant pumps, and the part of the steam generator means below the uppermost section of the steam generator are located wholly within the unremoved part of the nuclear steam supply section.

9. A nuclear reactor system constituting a part of a nuclear reactor-power plant to be installed at a predetermined use site integrated with components at said use site to form said plant, said use site being accessible by predetermined navigable waterways from a predetermined manufacturing site where said nuclear reactor system is constructed, the said nuclear reactor system including a barge capable of navigating said predetermined waterways from said manufacturing site to said predetermined use site and a nuclear steam-supply section integrated with said barge, said nuclear steam-supply section including (a) a nuclear reactor vessel, and
(b) steam-generating means including a lowermost portion having primary coolant piping connected to said nuclear reactor vessel and an uppermost portion through which steam is transmitted to the point of use, said uppermost portion being free of primary coolant piping, said nuclear reactor system having a length dimension substantially greater than its height dimension and being integrated into said barge with its length dimension generally horizontal and its height dimension generally vertical, the overall height of said nuclear reactor system being alterable to enable said nuclear reactor system to pass under bridges along said predetermined waterways by removal selectively, for passage through said waterways and installation at said use site, at at least one of at-least-two upper subsections, one of said upper subsections consisting of all parts of said nuclear reactor system above a first horizontal plane, said first horizontal plane being above said uppermost portion of said steam-generator means, and the other of said at-least-two-upper subsections consisting of all parts of said nuclear reactor system above a second horizontal plane, said second horizontal plane being below said first horizontal plane and between said uppermost portion and said lowermost portion of said steam generator means, said second horizontal plane also being above said nuclear reactor vessel 10. The nuclear reactor system of claim 9 wherein the nuclear steam-supply section is enclosed in a shell which is constructed with a first juncture seam in the uppermost portion, said junction seam defining the one upper subsection for removal for passage along the waterways and reinstallation at the use site, said shell being also constructed with a second juncture steam below said first juncture seam defining the other subsection for removal for passage along the waterways and reinstallation at the use site.

* * * * *